(12) United States Patent
Park

(10) Patent No.: US 11,601,590 B2
(45) Date of Patent: Mar. 7, 2023

(54) INTERFACE CONNECTED TO IMAGE SENSOR AND ELECTRONIC DEVICE COMPRISING INTERFACES CONNECTED AMONG PLURALITY OF PROCESSORS

(71) Applicant: Samsung Electronics Co., Ltd., Suwon-si (KR)

(72) Inventor: Jihwan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/965,132

(22) PCT Filed: Mar. 8, 2019

(86) PCT No.: PCT/KR2019/002756
§ 371 (c)(1),
(2) Date: Jul. 27, 2020

(87) PCT Pub. No.: WO2019/172723
PCT Pub. Date: Sep. 12, 2019

(65) Prior Publication Data
US 2021/0044745 A1    Feb. 11, 2021

(30) Foreign Application Priority Data
Mar. 8, 2018    (KR) ........................ 10-2018-0027451

(51) Int. Cl.
*H04N 5/225* (2006.01)
*H04N 5/232* (2006.01)
(Continued)

(52) U.S. Cl.
CPC ....... *H04N 5/23229* (2013.01); *G06F 15/163* (2013.01); *H04N 5/2257* (2013.01);
(Continued)

(58) Field of Classification Search
None
See application file for complete search history.

(56) References Cited

U.S. PATENT DOCUMENTS

| 9,549,120 B2 | 1/2017 | Rabii et al. |
| 9,554,100 B2 | 1/2017 | Gousev et al. |

(Continued)

FOREIGN PATENT DOCUMENTS

| JP | 2016-081429 A | 5/2016 |
| KR | 10-2008-0064441 A | 7/2008 |

(Continued)

*Primary Examiner* — Twyler L Haskins
*Assistant Examiner* — Wesley J Chiu
(74) *Attorney, Agent, or Firm* — Jefferson IP Law, LLP

(57) ABSTRACT

An electronic device, according to various embodiments, comprises: one or more image sensors; a first processor electrically connected to at least one of the one or more sensors via a first interface and including a first functional processing circuit and a second functional processing circuit capable of processing first output information of the first functional processing circuit; a second processor electrically connected to at least one of the one or more image sensors via a second interface; a third interface for connecting the first functional processing circuit and the second processor to transfer the first output information of the first functional processing circuit to the second processor; and a fourth interface for connecting the second functional processing circuit and the second processor to transfer second output information of the second processor to the second functional processing circuit. Various other embodiments are possible.

14 Claims, 9 Drawing Sheets

(51) Int. Cl.
  *G06F 15/163* (2006.01)
  *H04N 5/33* (2023.01)
(52) U.S. Cl.
  CPC ....... *H04N 5/2258* (2013.01); *H04N 5/23225* (2013.01); *H04N 5/33* (2013.01)

(56) References Cited

U.S. PATENT DOCUMENTS

| | | | |
|---|---|---|---|
| 10,127,051 | B2 | 11/2018 | Lee et al. |
| 2004/0196378 | A1* | 10/2004 | Kannermark ........ H04N 5/2258 348/207.99 |
| 2009/0073285 | A1* | 3/2009 | Terashima ....... H04N 5/232939 348/222.1 |
| 2014/0092270 | A1* | 4/2014 | Kim .................. H04N 5/23222 348/222.1 |
| 2014/0155123 | A1 | 6/2014 | Lee et al. |
| 2015/0046932 | A1 | 2/2015 | Kim et al. |
| 2015/0331480 | A1 | 11/2015 | Zhou et al. |
| 2016/0109927 | A1 | 4/2016 | Hasegawa et al. |
| 2016/0191795 | A1* | 6/2016 | Han .......................... B60R 1/00 348/36 |
| 2016/0368417 | A1* | 12/2016 | Bassi ..................... H04N 7/181 |
| 2017/0061593 | A1* | 3/2017 | Alahmar ................ G08G 1/165 |
| 2017/0070696 | A1* | 3/2017 | Shiraishi ................ H04N 5/378 |
| 2017/0116478 | A1 | 4/2017 | Gousev et al. |
| 2019/0104920 | A1* | 4/2019 | Hashimoto ........ A61B 1/00009 |
| 2020/0142762 | A1* | 5/2020 | Tang ................... G06F 13/4282 |

FOREIGN PATENT DOCUMENTS

| | | |
|---|---|---|
| KR | 10-2014-0071157 A | 6/2014 |
| KR | 10-2015-0017897 A | 2/2015 |
| KR | 10-2016-0054850 A | 5/2016 |
| KR | 10-2017-0007287 A | 1/2017 |

\* cited by examiner

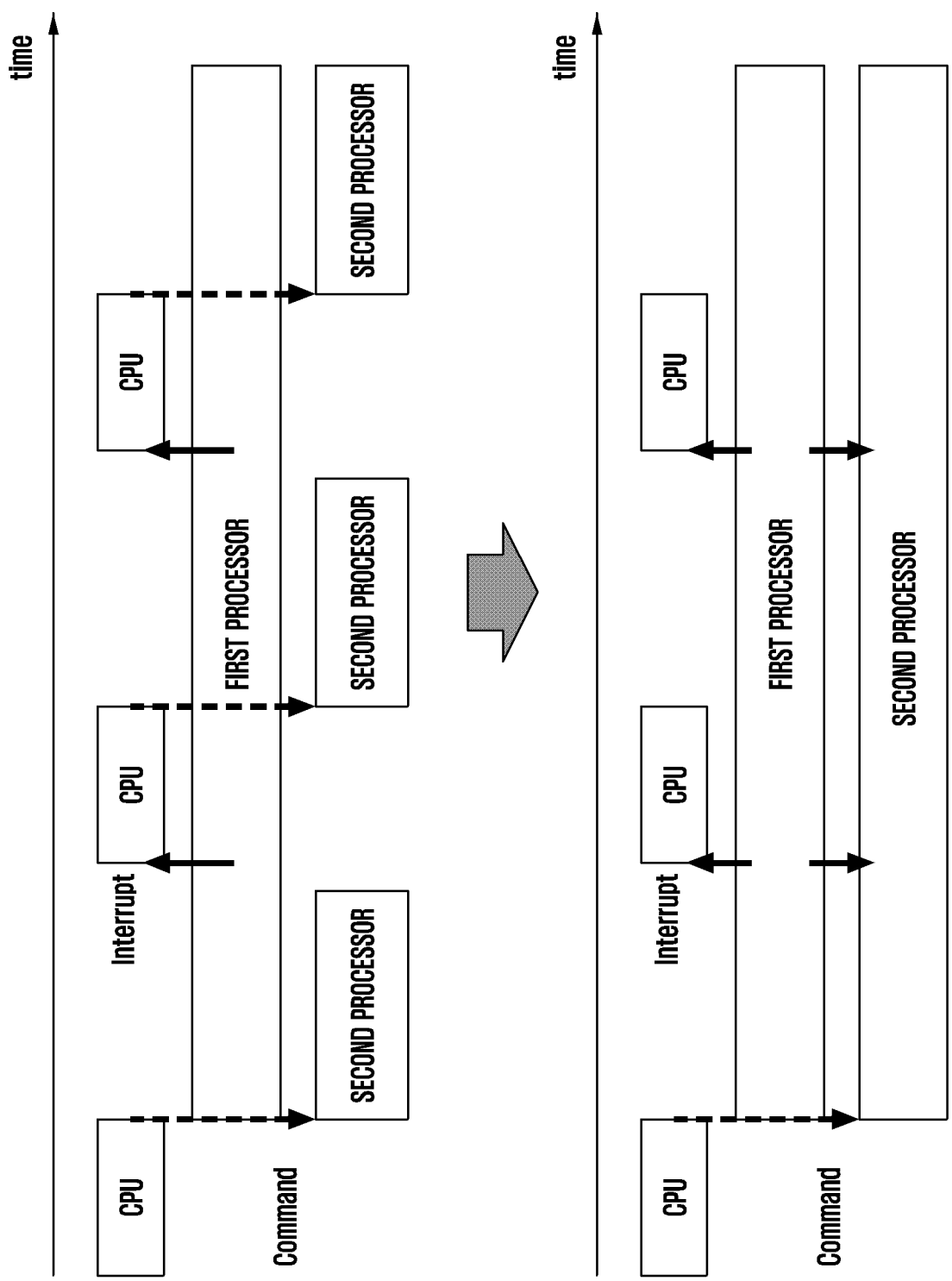

INTERFACE CONNECTED TO IMAGE SENSOR AND ELECTRONIC DEVICE COMPRISING INTERFACES CONNECTED AMONG PLURALITY OF PROCESSORS

TECHNICAL FIELD

Various embodiments of the disclosure relate to an electronic device including a plurality of processors, and to an electronic device including an interface connected to an image sensor and an interface connecting a plurality of processors.

BACKGROUND ART

An electronic device can perform various functions in a complex manner. For example, a mobile communication terminal, a personal digital assistant (PDA), an electronic notebook, a smart phone, a tablet personal computer (PC), and the like have been developed to provide more convenience to users while realizing advanced performance.

The electronic device may include a plurality of processors to provide various functions. For example, the electronic device may include a plurality of processors configured to perform predetermined functional processing using sensing information acquired through a sensor.

DISCLOSURE OF INVENTION

Technical Problem

With the progress of technology, the electronic device may be required to provide an improved function than a function intended at the time of initial hardware design or an additional function.

For example, when adding or supplementing a specific function required at a stage prior to final commercialization rather than the initial design time point of the electronic device, it is possible to add or supplement the above function by adding an instruction-based processor to the electronic device.

However, if the instruction-based processor is added after the hardware design time point, information transmission and reception between an existing hardware-based processor and the instruction-based processor should be performed in an indirect manner through the system memory of the electronic device, and information processing also requires continuous control by a main processor. As a result, unnecessary time delay and power waste can be generated.

Various embodiments of the disclosure may provide an electronic device that supports a more improved function through an interface supporting information transmission and reception between a plurality of processors in a functional unit.

Solution to Problem

An electronic device according to various embodiments may include: one or more image sensors; a first processor configured to be electrically connected to at least one of the one or more sensors via a first interface and to include a first functional processing circuit and a second functional processing circuit capable of processing first output information of the first functional processing circuit; a second processor configured to be electrically connected to the at least one of the one or more image sensors via a second interface; a third interface configured to connect the first functional processing circuit and the second processor to transfer the first output information of the first functional processing circuit to the second processor; and a fourth interface configured to connect the second functional processing circuit and the second processor to transfer second output information of the second processor to the second functional processing circuit.

An electronic device according to various embodiments may include: one or more image sensors; a first processor configured to be electrically connected to a first image sensor set among the one or more image sensors through a first interface and including a first functional processing circuit and a second functional processing circuit capable of processing first output information of the first functional processing circuit; a second processor configured to be electrically connected to a second image sensor set among the one or more image sensors via a second interface; a third interface configured to connect the first functional processing circuit and the second processor to transfer the first output information of the first functional processing circuit to the second processor; and a fourth interface configured to connect the second functional processing circuit and the second processor to transfer second output information of the second processor to the second functional processing circuit.

An electronic device according to various embodiments may include: one or more image sensors; a sensor hub; a first processor configured to be electrically connected to at least one of the one or more image sensors via a first interface and including a first functional processing circuit and a second functional processing circuit capable of processing first output information of the first functional processing circuit; a second processor configured to be electrically connected to the at least one of the one or more image sensors and the sensor hub via a second interface; a third interface configured to connect the first functional processing circuit and the second processor to transfer the first output information of the first functional processing circuit to the second processor; and a fourth interface configured to connect the second functional processing circuit and the second processor to transmit second output information of the second processor to the second functional processing circuit.

Advantageous Effects of Invention

An electronic device according to various embodiments of the disclosure may store or read, when a plurality of functional processing via a plurality of processors is required, information before and after performing each function in the memory of the electronic device, or may enable direct information transmission and reception between the processors without intervention through a main processor, thereby reducing information processing time and reducing unnecessary power consumption of the electronic device.

In addition, an instruction-based processor may receive both information through a sensor hub and information through an image sensor to perform specific functional processing simultaneously, thereby supporting accurate and fast image data processing.

BRIEF DESCRIPTION OF DRAWINGS

FIG. 6 is a diagram illustrating an interrupt transmission process over time in an electronic device according to various embodiments of the disclosure.

MODE FOR THE INVENTION

Figure 1:
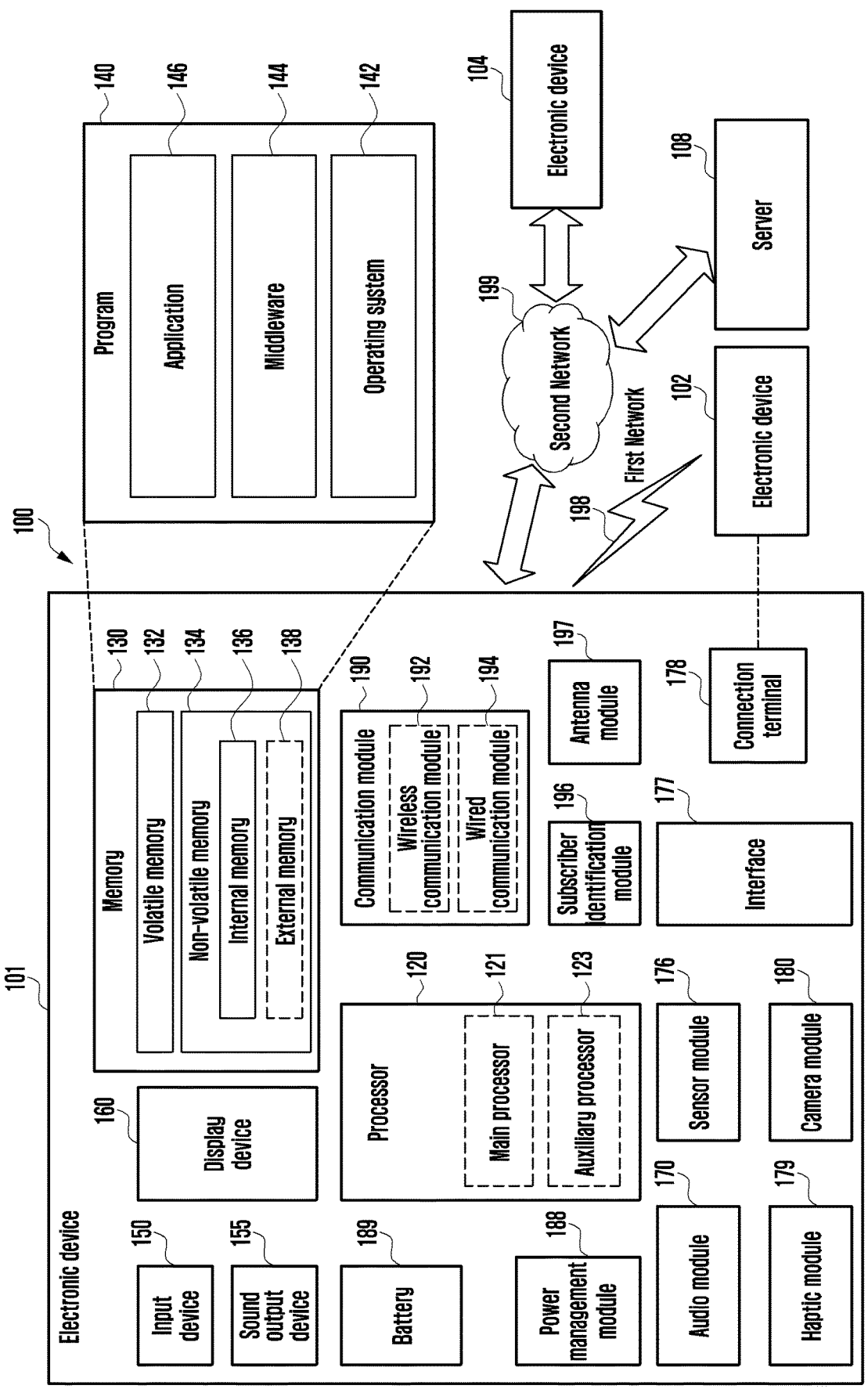
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
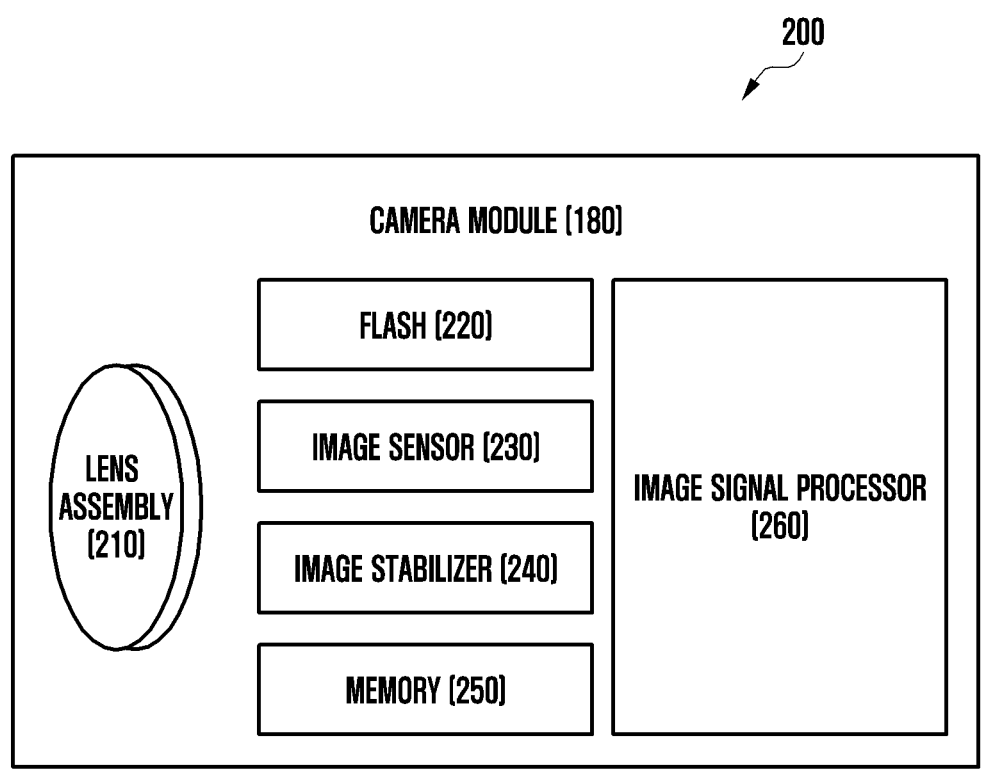
FIG. 2 is a block diagram 200 illustrating a camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses.

According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening).

Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
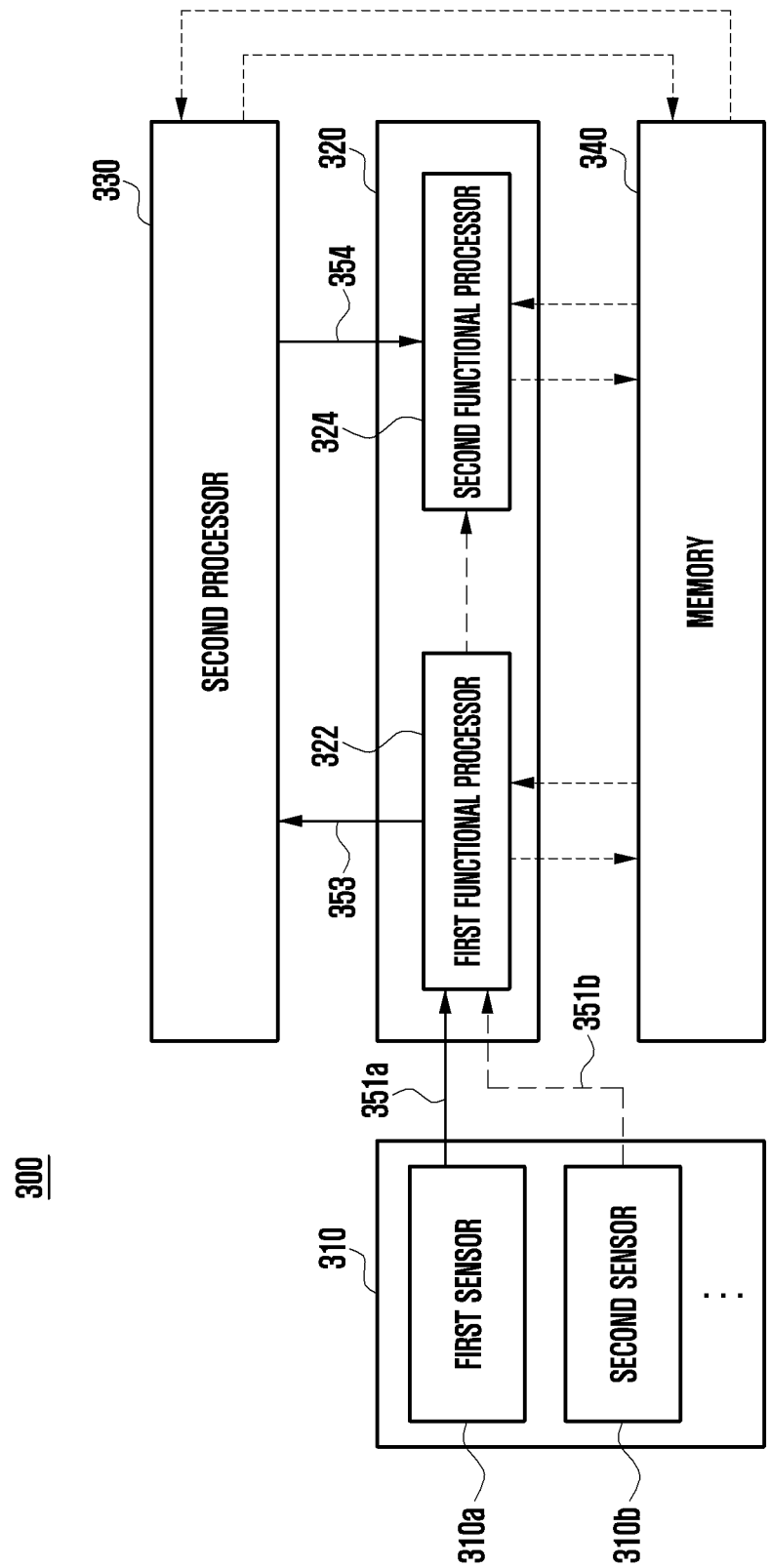
FIG. 3A is a block diagram illustrating information processing of an electronic device according to various embodiments of the disclosure.

FIG. 3A is a block diagram illustrating information processing of an electronic device according to various embodiments of the disclosure.

Referring to FIG. 3A, an electronic device 300 may include one or more sensors 310 (e.g., a first sensor 310a and a second sensor 310b), a first processor 320, a second processor 330, and a memory 340.

According to various embodiments, the first processor 320 may include a plurality of functional processing circuits (e.g., a first functional processing circuit 322 and a second functional processing circuit 324) that are distinguished based on functions that can be processed by the first processor 320.

For example, the plurality of functional processing circuits 322 and 324 may process a preset function. For example, the first functional processing circuit 322 may process a first function, and the second functional processing circuit 324 may process a second function.

According to an embodiment, the second functional processing circuit 324 may use predetermined information (e.g., first output information) processed through the first functional processing circuit 322 to process a designated function (e.g., second function).

According to an embodiment, the first processor 320 may include an image signal processor (ISP) (e.g., the image signal processor 260). For example, the first processor 320 may use information (or information stored in the memory) obtained through the image sensor 230 to process image processing functions (e.g., depth map generation, three-dimensional (3D) modeling, panorama generation, feature point extraction, image synthesis, or image compensation {noise reduction, resolution adjustment, brightness adjustment, blurring, sharpening, or softening}). For example, the first functional processing circuit may process a first function for converting Bayer format information obtained from an image sensor into RGB format information. For example, the second functional processing circuit may process a second function for converting RGB format information processed through the first functional processing circuit into YUV format information.

According to various embodiments, the electronic device 300 may include interfaces 351a and 351b for electrically connecting at least one of the one or more sensors 310 and the first processor 320. For example, the at least one of the one or more sensors 310 may be electrically connected to the first functional processing circuit 322 of the first processor 320 through the first interface 351a or 351b.

For example, as illustrated in FIG. 3A, the first functional processing circuit 322 of the first processor 320 may receive information obtained through the at least one of the one or more sensors 310. For example, the first functional processing circuit 322 may receive information obtained through the at least one of the one or more sensors 310 via the first interface 351a or 351b, and may process a designated function (e.g., first function) using at least a portion of the received information.

According to various embodiments, the second processor 330 may receive information from any one circuit of the plurality of functional processing circuits 322 and 324 of the first processor 320 and may process a designated function using the received information.

The electronic device 300 according to various embodiments of the disclosure may include a third interface 353 that connects the first functional processing circuit 322 and the second processor 330 to transfer information (e.g., first output information) processed by the first functional processing circuit 322 of the first processor 320 to the second processor 330.

For example, the second processor 330 may use first output information received through the third interface 353 from the first functional processing circuit 322 to process a designated function (e.g., second function). For example, the second processor 330 may generate second output information by processing the second function using the first output information.

The electronic device 300 according to various embodiments of the disclosure may further include a fourth interface 354 that connects the second functional processing circuit 324 and the second processor 330 to transfer the second output information of the second processor 330 to the second functional processing circuit 324 of the first processor 320.

For example, the second functional processing circuit 324 may use the second output information processed and received through the second processor 330 to process a designated function.

For example, the second functional processing circuit 324 may use at least one of the first output information from the first functional processing circuit 322 and the second output information from the second processor 330 to process a designated function.

According to an embodiment, the function processed by the second functional processing circuit 324 may be the same function as the second function, which is the function processed by the second processor. For example, the second functional processing circuit 324 may process the second function using the first output information of the first functional processing circuit 322.

According to another embodiment, the second functional processing circuit 324 may process a third function using the first output information obtained from the first functional processing circuit 322 and the second output information obtained from the second processor 330.

According to various embodiments, the second processor 330 may be a processor configured to process a designated function based on an instruction. For example, the second processor 330 may include a vision processor. For example, the second processor 330 may process at least one function of vision image processing, image recognition, image tracking, depth map acquisition, or processing using a neural network.

The one or more sensors 310 according to various embodiments may include an image sensor. For example, the one or more sensors 310 may include an image sensor (e.g., the image sensor 230) of a camera module (e.g., the camera module 180) of the electronic device.

The memory 340 (e.g., the memory 250) according to various embodiments may store information processed through the first processor 320 or the second processor 330. Although not shown, the memory 340 may store information obtained from the one or more sensors 310. For example, the memory 340 may include a system memory (e.g., dynamic random access memory (DRAM)).

For example, the first processor 320 may access the memory 340 to read information obtained and stored through the one or more sensors 310, and may store information (e.g., first output information) processed through the first functional processing circuit 322 or information processed through the second functional processing circuit 324 in the memory 340. For example, the second processor 330 may store information (e.g., second output information) processed through the second processor 330 in the memory 340.

According to various embodiments of the disclosure, the second processor 330 of the electronic device 300 may receive the first output information of the first functional processing circuit 322 through the third interface 353 connected to the first functional processing circuit 322 even without accessing the memory 340, thereby inducing the effect of reducing the power consumption of the electronic device 300 according to the reduced use of the memory 340.

Although not illustrated, the electronic device 300 according to various embodiments may further include a main processor (e.g., third processor) that controls information processing and transmission and reception of information in the one or more sensors 300, the plurality of functional processing circuits (e.g., the first functional processing circuit 322 and the second functional processing circuit 324) of the first processor 320, and the second processor 330.

For example, the electronic device 300 may further include an interface (e.g., fifth interface (not illustrated)) that electrically connects the main processor and the second processor.

For example, the second processor may use at least a portion of information obtained through the at least one of the one or more image sensors or the first output information received from the first processor to process a designated function and to obtain the second output information according to the above processing result. For example, the second processor may directly transmit the second output information to the main processor through the interface (not illustrated) connecting the main processor and the second processor when does not need additional functional processing using the first processor.

Figure 3B:
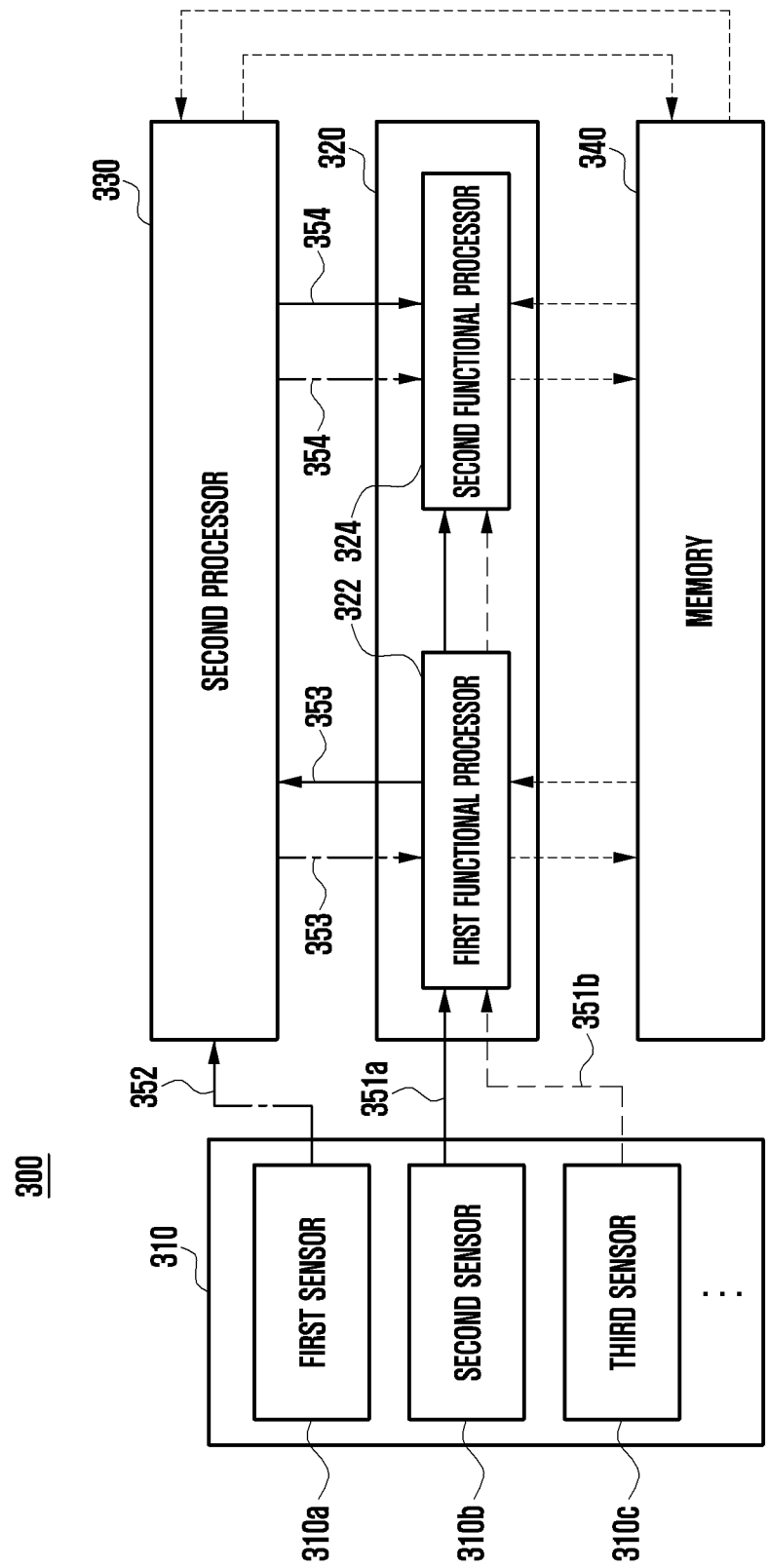
FIG. 3B is a block diagram illustrating information processing of an electronic device according to various embodiments of the disclosure.

FIG. 3B is a block diagram illustrating information processing of an electronic device according to various embodiments of the disclosure.

The electronic device 300 according to various embodiments may include the one or more sensors 310, the first processor 320 including the plurality of functional processing circuits (e.g., the first functional processing circuit 322 and the second functional processing circuit 324), the second processor 330, and the memory 340.

The electronic device 300 according to various embodiments may include the first interface 351a or 351b that electrically connects at least one of the one or more sensors 310 and the first processor 320 to transfer sensing information of the at least one (e.g., the second sensor 310b and the third sensor 310c) of the one or more sensors 310 to the first processor 320.

The electronic device 300 according to various embodiments may include the third interface 353 that electrically connects the first functional processing circuit 322 and the second processor 330 to transfer first output information processed through the first functional processing circuit 322 of the first processor 320 to the second processor 330.

The electronic device 300 according to various embodiments may include the fourth interface 354 that electrically connects the second functional processing circuit 324 and the second processor 330 to transfer second output information processed through the second processor 330 to the second functional processing circuit 324 of the first processor 320.

The electronic device 300 according to various embodiments may further include a second interface 352 that electrically connects the at least one of the one or more sensors 310 and the second processor 330.

For example, the second processor 330 may receive sensing information obtained through the at least one (e.g., the first sensor 310*a*) of the one or more sensors 310 through the second interface 352, and may process a designated function using the sensing information of the first sensor 310*a*.

For example, the first processor 320 may be electrically connected to a specific sensor (e.g., the second sensor 310*b* or the third sensor 310*c*) among the plurality of sensors 310 through the first interfaces 351*a* or 351*b*. In addition, the second processor 330 may be electrically connected to another sensor (e.g., the first sensor 310*a* or a second image sensor set) other than the sensor connected to the first interface among the plurality of sensors 310, via the second interface 352.

For example, the first processor 320 may be a hardware processor including a plurality of functional processing circuits, and the second processor 330 may be a processor that is separated from the first processor 320 and is configured to process a designated function based on an instruction.

For example, the second processor 330 may process a function (e.g., the third function) that is different from a function (e.g., the first function and the second function) previously configured to be processed by the first processor 320.

According to various embodiments, the second processor 330 may process the designated function using at least a portion of sensing information transmitted from the one or more sensors 310 via the second interface 352 or first output information transmitted from the first functional processing circuit 322 of the first processor 320 via the third interface 353.

Figure 3C:
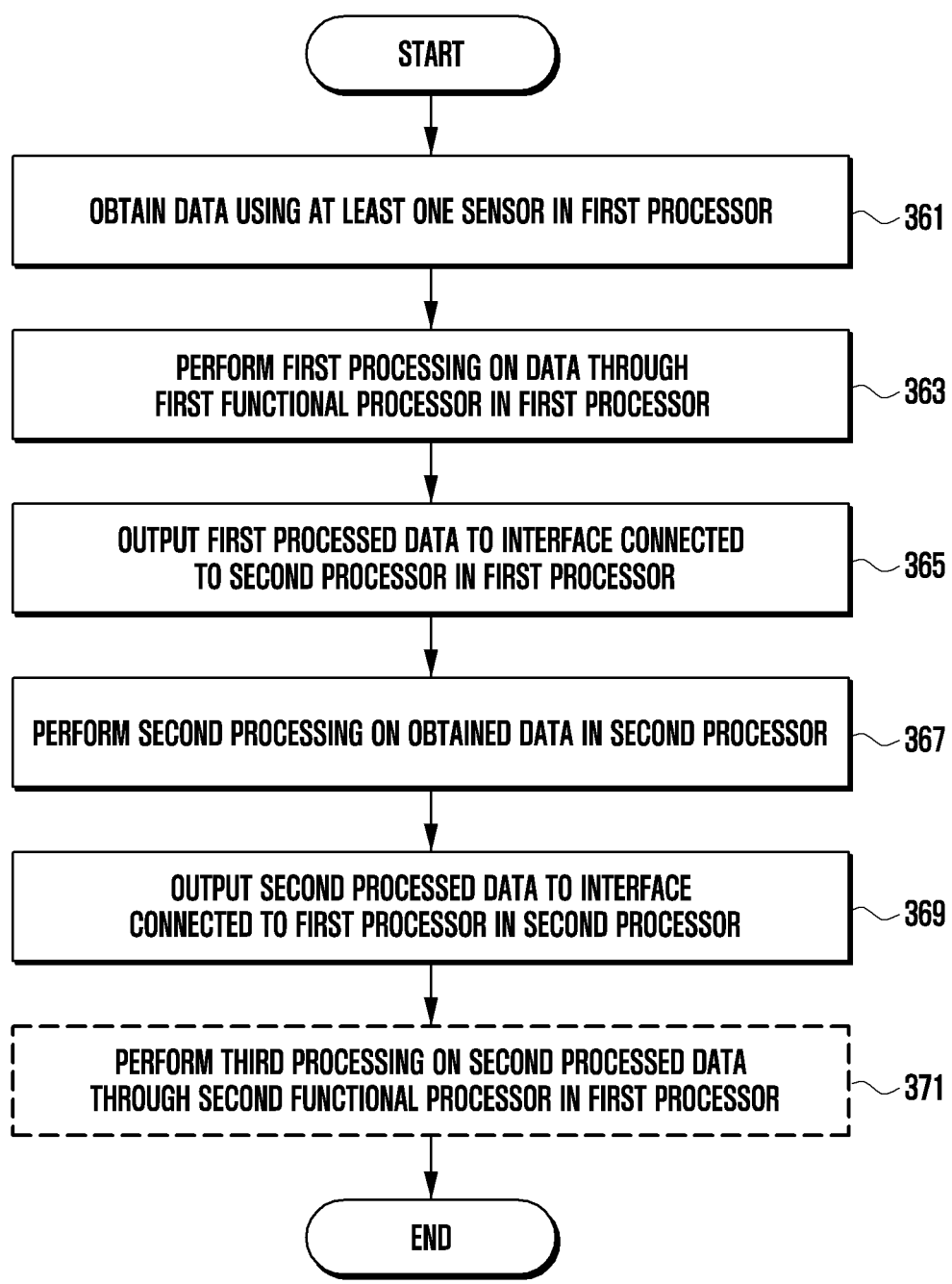
FIG. 3C is a flowchart illustrating information processing in an electronic device according to various embodiments of the disclosure.

FIG. 3C is a flowchart illustrating information processing in an electronic device according to various embodiments of the disclosure.

Referring to FIG. 3C, in operation 361, a first processor of an electronic device according to various embodiments may obtain data (e.g., sensing information) using at least one sensor. For example, the electronic device may include an interface that connects a first processor and the at least one sensor, and the first processor may receive data obtained and output from the at least one sensor via an interface.

In operation 363, according to various embodiments, the first processor may perform first functional processing on the obtained data through any one circuit (e.g., the first functional processor) of a plurality of functional processing circuits (e.g., the first functional processing circuit and the second functional processor) included in the first processor.

In operation 365, according to various embodiments, the first processor may output data (e.g., first output information) obtained by performing the first functional processing via an interface that connects the first processor and the second processor. For example, the second processor may receive data processed from the first processor via the interface connected to the first processor and the second processor.

In operation 367, according to various embodiments, the second processor may perform second functional processing using data output and obtained from the first processor.

According to an embodiment, the second function performed in the second processor may include a function different from the first function performed in the first processor.

According to another embodiment, the second processor may obtain data via an interface connected to the at least one sensor, and may perform second functional processing using the obtained data. For example, the second function may include the same function as the first function performed in the first processor.

In operation 369, according to various embodiments, the second processor may output data (e.g., the second output information) obtained by performing the second functional processing using the interface connected to the first processor. For example, the first processor may receive data obtained by performing predetermined functional processing in the second processor via the interface connecting the first processor and the second processor.

In operation 371, according to various embodiments, the first processor may perform third functional processing using the data (e.g., the second output information) obtained by performing the second functional processing in the second processor. For example, in the functional processing circuit (e.g., the second functional processor) different from the functional processing circuit (e.g., the first functional processor) that has performed the first functional processing among the plurality of functional processing circuits of the first processor, the third functional processing may be performed. The information processing of the electronic device according to various embodiments may not include the configuration of operation 371.

Figure 4A:
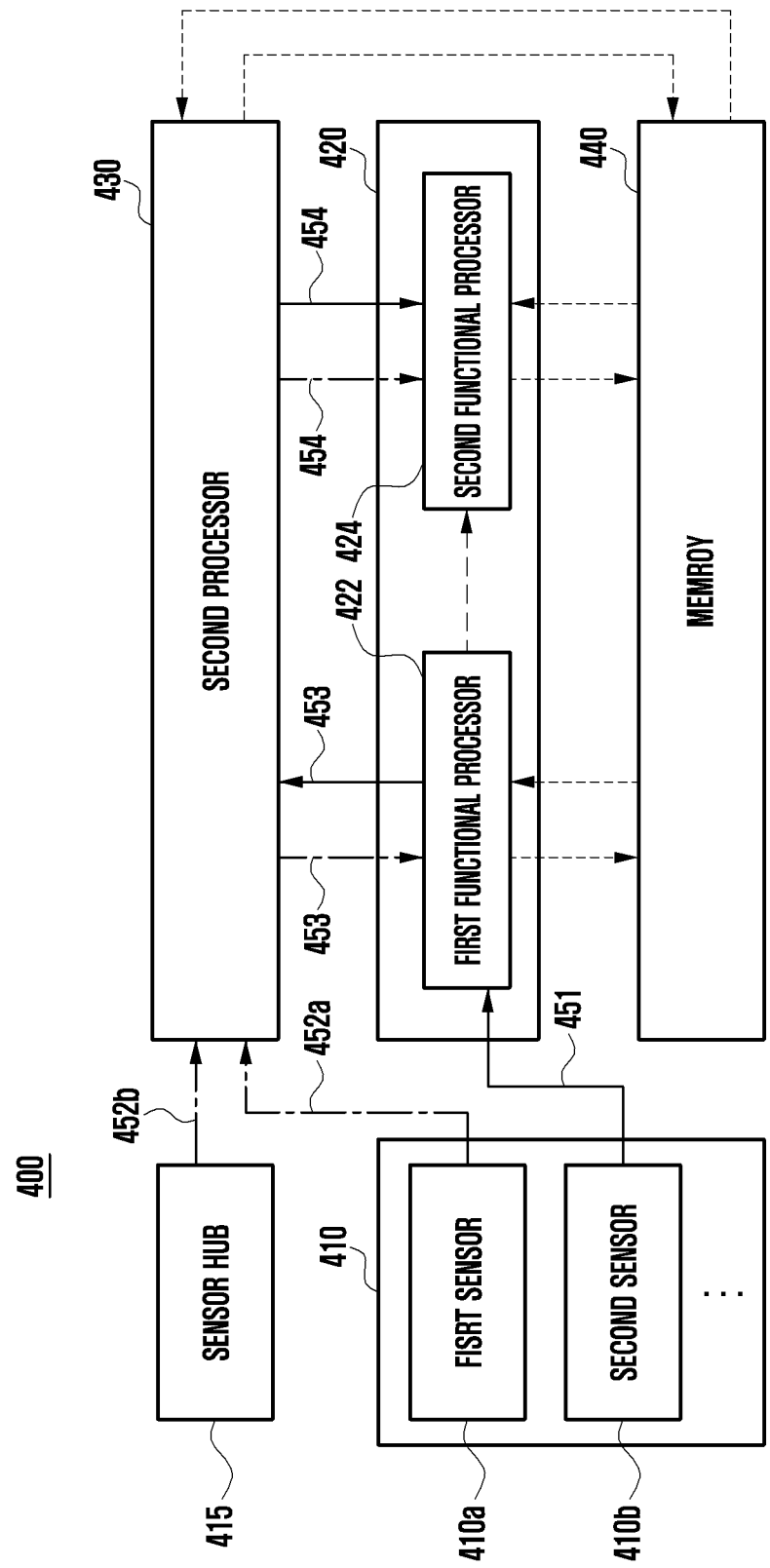
FIG. 4A is a block diagram illustrating information processing of an electronic device according to various embodiments of the disclosure.

FIG. 4A is a block diagram illustrating information processing of an electronic device according to various embodiments of the disclosure.

Referring to FIG. 4A, an electronic device 400 according to various embodiments may include one or more image sensors 410 (e.g., a first sensor 410*a* and a second sensor 410*b*), a sensor hub 415, a first processor 420 including a plurality of functional processing circuits (e.g., a first functional processing circuit 422 and a second functional processing circuit 424), a second processor 430, and a memory 440.

According to various embodiments, the first processor 420 may be electrically connected to at least one (e.g., the second sensor 410*b*) of the one or more image sensors 410 via a first interface 451.

For example, the first functional processing circuit 422 of the first processor 420 may receive information obtained through the at least one of the one or more image sensors (e.g., the second sensor 410*b*), via the first interface 451, and may process a first function, which is a designated function, using the received sensing information. In addition, the second functional processing circuit 424 of the first processor 420 may process a second function, which is a designated function, using first output information of the first functional processing circuit 422.

According to various embodiments, the second processor 430 may be electrically connected to the sensor hub 415 and the at least one (e.g., the first sensor 410*a*) of the one or more image sensors 410 via a second interface 452*a*.

For example, the second processor 430 may be a processor configured to process a designated function based on an instruction. For example, the second processor 430 may process a designated function using at least one of information obtained through the at least one of the one or more image sensors 410, information obtained through the sensor hub, or the first output information.

For example, the second processor 430 may receive sensing information processed by the sensor hub 415 via the second interface 452*b*. According to an embodiment, information received through the sensor hub may include acceleration sensing information.

For example, the second processor 430 may receive information from the sensor hub 415 and the at least one of the one or more image sensors 410 via the interfaces 452*a* and 452*b*, respectively.

According to various embodiments, the second processor 430 may process a designated function using both the information obtained through the sensor hub and the information obtained through the at least one of the image sensors 410.

According to an embodiment, the second processor 430 may use both the acceleration sensing information obtained through the sensor hub and the image information obtained through the at least one of the image sensors 410 to generate information related to the position of a user who uses the electronic device 400. According to another embodiment, the second processor 430 may generate depth information of an image.

Since the electronic device 400 according to various embodiments may simultaneously perform specific functional processing using both the information received from the sensor hub 415 and the information received from the at least one of the one or more image sensors 410, it is possible to omit an operation for synchronizing the time information of both information or obtain accurate location data.

The electronic device 400 according to various embodiments may include interfaces 453 and 454 that enable the second processor 430 to transmit and receive information to and from the at least one of the plurality of functional processing circuits of the first processor 420.

According to various embodiments, the second processor 430 may transmit information (e.g., second output information) generated by processing the designated function to any one of the plurality of functional processing circuits of the first processor 420. For example, the second processor 430 may transmit the generated information to the first functional processing circuit 422 or the second functional processing circuit 424.

According to another embodiment, when the generated information does not require additional functional processing by the first processor 420, the second processor 430 may directly transmit the generated information to the memory 440 or an external processor (not illustrated).

Figure 4B:
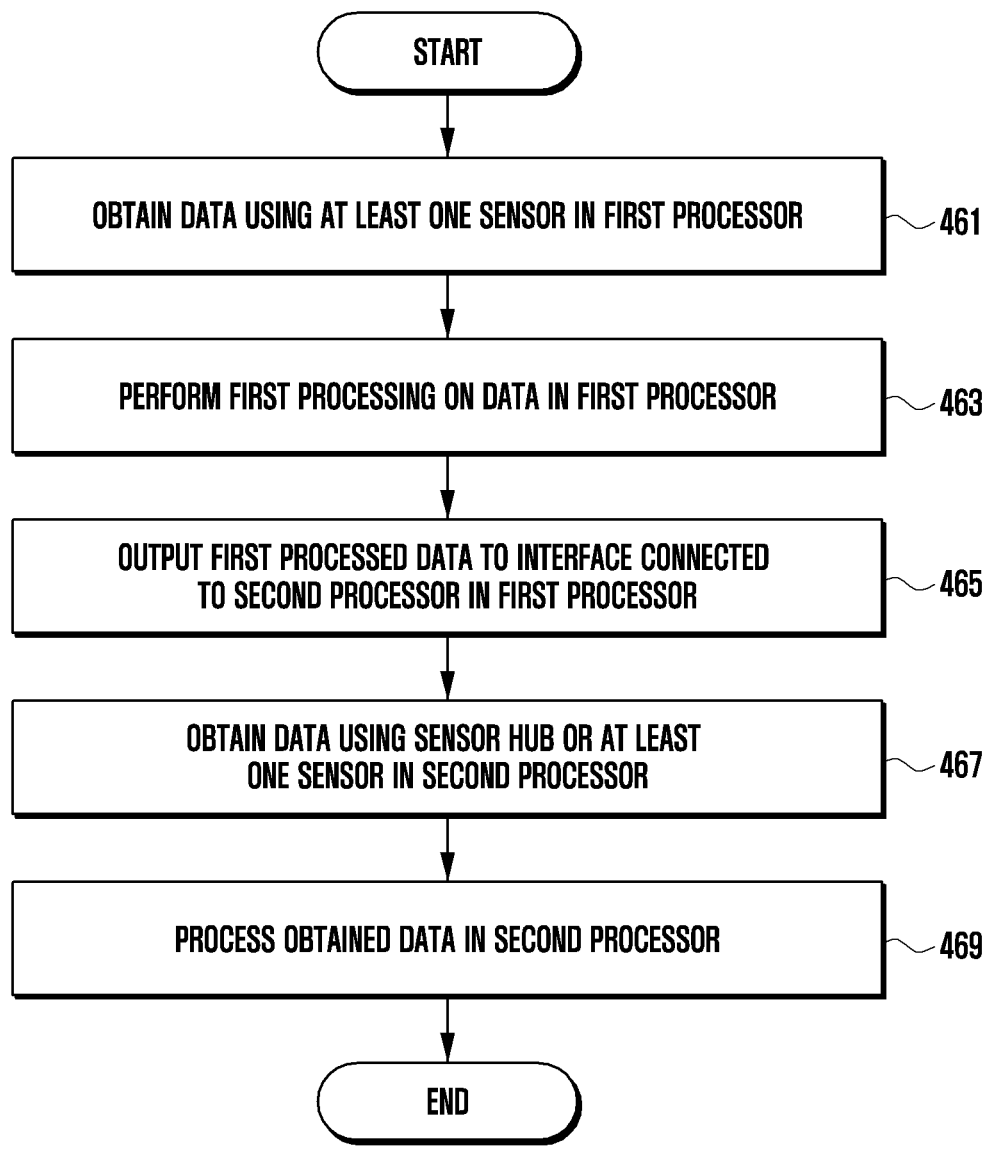
FIG. 4B is a flowchart illustrating information processing of an electronic device according to various embodiments of the disclosure.

FIG. 4B is a flowchart illustrating information processing of an electronic device according to various embodiments of the disclosure.

Referring to FIG. 4B, in operation 461, an electronic device according to various embodiments may obtain data (e.g., sensing information) using at least one sensor in a first processor. For example, the electronic device may include an interface connecting the first processor and at least one sensor, and the first processor may receive data obtained using the at least one sensor via the interface.

In operation 463, according to various embodiments, the first processor may perform first functional processing on the data obtained using the at least one sensor.

In operation 465, according to various embodiments, the first processor may output data (e.g., first output information) obtained by performing the first functional processing via an interface connecting the first processor and the second processor.

For example, the second processor may receive data obtained by performing the first functional processing from the first processor via the interface connected to the first processor and the second processor.

In operation 467, according to various embodiments, the second processor may obtain data (e.g., the sensing information) via an interface connecting the second processor and the sensor hub (or the at least one sensor). For example, the data obtained using the sensor hub (or the at least one sensor) in the second processor may include data different from the data obtained using the at least one sensor in the first processor.

In the electronic device according to various embodiments, operations 461 to 465 may be performed before operation 467, or simultaneously with or after operation 467, and are not limited by the order thereof.

In operation 469, according to various embodiments, the second processor may perform predetermined functional processing using the data obtained through operation 465 and operation 467.

Figure 5:
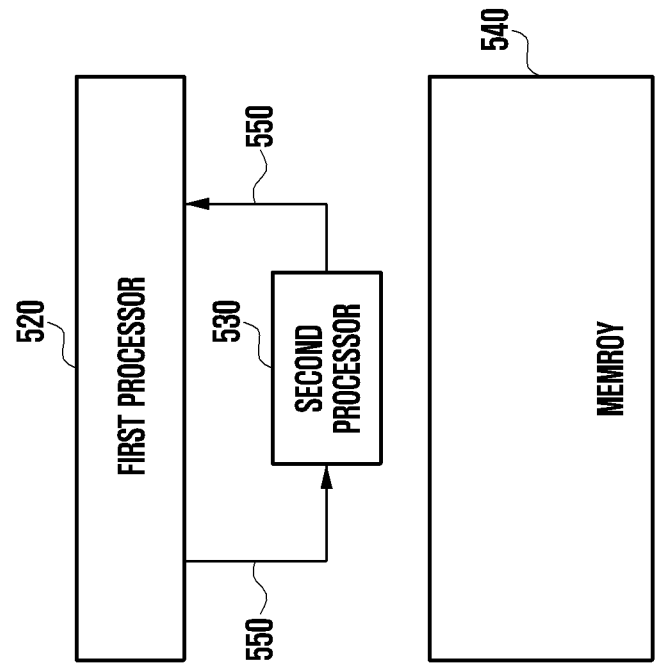
FIG. 5 is a diagram illustrating an information processing method of a second processor according to various embodiments of the disclosure.
Figure 5:
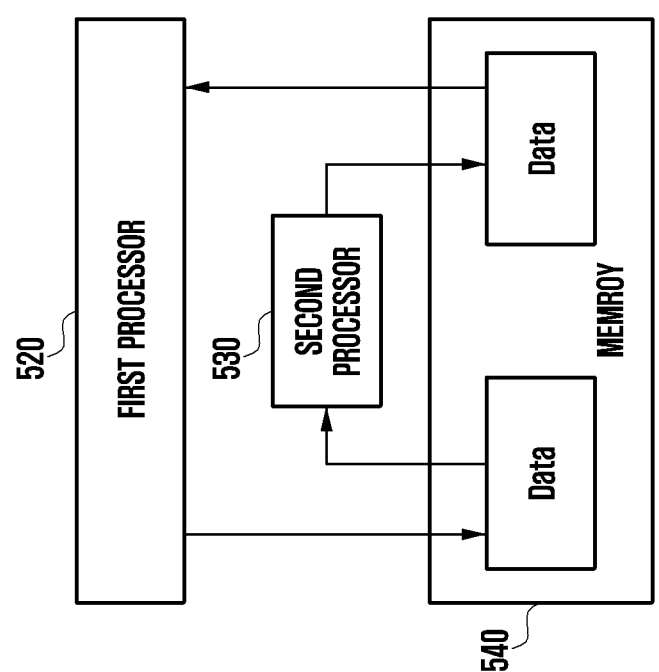

FIG. 5 is a diagram illustrating an information processing method of a second processor according to various embodiments of the disclosure.

An electronic device according to various embodiments may include a plurality of processors. For example, the plurality of processors may include a first processor 520 which is a hardware processor including a plurality of functional processing circuits, and a second processor 530 that is separated from the first processor 520 and configured to process a designated function based on an instruction.

According to an embodiment, the second processor 530 may read specific data (e.g., first output information) processed by the first processor 520 from a memory 540 of the electronic device, and may process a designated function using the data read from the memory. For example, the first output information may be information processed through the first functional processing circuit for processing a first function among the plurality of functional processing circuits of the first processor 520.

For example, the second processor 530 may store data (e.g., second output information) obtained through the designated functional processing in the memory 540, and the first processor 520 may read data (e.g., the second output information) stored by the second processor 530 from the memory 540 to process a specific function. For example, the first processor 520 may process a specific function (e.g., the second function) using the data (e.g., the second output information) stored in the memory in the second functional processing circuit for processing a second function among the plurality of functional processing circuits.

In the electronic device according to various embodiments of the disclosure, the first processor 520 and the second processor 530 may be electrically connected to each other via the interface 550 to transmit and receive predetermined information to and from each other. For example, the second processor 530 may receive the first output information processed from the first functional processing circuit of the first processor 520 via the interface 550, and may obtain the second output information by processing a function designated to be processed by the second processor 530 using the first output information. In addition, the second processor 530 may transmit the obtained second output information to the second functional processing circuit of the first processor 520 via the interface 550. For example, the second functional processing circuit may process a designated function using the second output information.

In the electronic device according to various embodiments of the disclosure, the second processor 530 may directly receive information from the first processor 520 via the interface 550 even without reading information processed by the first processor 520 from the memory 540 by accessing the memory 540. In addition, when the information processed by the second processor 530 requires predetermined functional processing through the first processor 520, the second processor 530 may transmit the information processed by the second processor 520 directly to the first processor 520 even without storing the information processed by the second processor 530 in the memory 540, whereby the first processor 520 may receive information of the second processor 530 even without accessing the memory 540.

According to various embodiments of the disclosure, since the plurality of functional processing circuits of the first processor 520 are respectively connected to the second processor 530 and the interface 550 to transmit and receive information, the storing of the information in the memory 540 and the accessing of the memory 540 to read the information may be omitted, thereby reducing power consumption of the electronic device. In addition, when the information is image data, there is no need to process the corresponding function in a frame unit or transmit/store data, so that latency per frame unit does not occur.

According to various embodiments of the disclosure, the second processor 530 may further include an interface (e.g., the second interface) that electrically connects the sensor hub or the at least one of the one or more sensors and the second processor 530.

For example, the second processor 530 may receive information from the at least one of the sensor hub or the one or more sensors via the interface to process a designated function even without separately accessing the memory 540.

FIG. 6 is a diagram illustrating an interrupt transmission process over time in an electronic device according to various embodiments of the disclosure.

Referring to FIG. 6, an electronic device according to various embodiments may include a plurality of processors.

For example, the electronic device may include a first processor, a second processor, and a main processor (a central processor (CPU)) capable of controlling the first processor and the second processor. For example, the main processor may control information transmission and reception and/or information processing in the first processor and the second processor.

According to various embodiments, the main processor may transmit a command to the first processor and the second processor so that the first processor and the second processor can process a predetermined function. For example, the second processor may be configured to process a designated function using information processed by the first processor.

For example, the first processor may generate an interruption at a specific time point so that the information processed by the first processor can be smoothly processed by the second processor.

According to various embodiments, the main processor may receive the interruption from the first processor and may transmit the command to the first processor and the second processor based on the interruption. For example, the second processor may receive the interruption generated from the first processor indirectly through the command of the main processor.

According to various embodiments of the disclosure, the electronic device may further include an interface that electrically connects each of the plurality of functional processing circuits of the first processor and the second processor. For example, the first processor and the second processor may transmit and receive predetermined information through the interface. For example, the second processor may receive the processed first output information from the first functional processing circuit of the first processor via the interface. For example, the second processor may obtain the second output information by processing a function designated to be processed by the second processor using the received first output information. The second processor may transmit the obtained second output information to the second functional processing circuit of the first processor 520 via the interface.

According to various embodiments, the main processor may transmit the command to the first processor and the second processor so that the first processor and the second processor can respectively process a predetermined function. For example, the second processor may receive a command to process a designated function using the information processed by the first processor.

For example, the first processor may generate an interruption at a specific time point so that the information processed by the first processor can be smoothly processed by the second processor.

According to various embodiments of the disclosure, the second processor may receive the interruption directly from the first processor via the interface connecting the first processor and the second processor.

For example, the second processor may receive the interruption generated by the first processor via an interface (e.g., a third interface) connecting the first functional processing circuit and the second processor among the plurality of functional processing circuits of the first processor. For example, the second processor may receive the interruption generated by the first processor via an interface (e.g., a fourth interface) connecting the second processor and the second functional processing circuit of the first processor.

According to various embodiments of the disclosure, after receiving a command related to initial functional processing from the main processor, the second processor may receive the interruption in the first processor via the interface connecting the second processor and the first processor to process the designated function even without receiving a command related to the interruption from the main processor again whenever the interruption is generated by the first processor. For example, the second processor may smoothly process the designated function without an additional interruption of the main processor even though the interruption is generated by the first processor, thereby reducing the power consumption of the electronic device while minimizing the operation delay time.

According to various embodiments of the disclosure, the second processor 530 may further include an interface (e.g., the second interface) electrically connecting at least one of the sensor hub or the one or more sensors and the second processor 530. For example, the second processor 530 may receive information from the at least one of the sensor hub or the one or more sensors via the interface to process a designated function without separately accessing the memory 540.

According to various embodiments of the disclosure, the second processor 530 may directly receive the interruption generated from the sensor hub or the one or more sensors via the interface electrically connecting the at least one of the sensor hub or the one or more sensors and the second processor 530.

The electronic device according to various embodiments disclosed in the present document may be various types of devices. The electronic device may include, for example, at least one of a portable communication device (e.g., a smart phone), a computer device, a portable multimedia device, a portable medical device, a camera, a wearable device, or a home appliance. The electronic device according to the embodiment of the present document is not limited to the above-described devices.

It should be understood that the various embodiments of the present document and the terms used therein are not intended to limit the techniques described herein to specific embodiments, but rather to include various modifications, equivalents, and/or alternatives of the embodiments. In connection with the description of the drawings, like reference numerals may be used for similar components. The singular expressions may include plural expressions unless the context clearly dictates otherwise. In this document, the expressions "A or B", "at least one of A and/or B", "A, B or C", or "at least one of A, B, and C" may include possible combinations of all of the items listed together. Expressions such as "first", "second", "first" or "second" may be used to qualify the components, regardless of order or importance, and to distinguish one component from another and does not limit the constituent elements. When it is mentioned that some (e.g., first) components are "(functionally or communicatively) connected" or "connected" to another (second) component, the above some components may be connected directly to the other components, or may be connected through another component (e.g., a third component).

As used herein, the term "module" includes units composed of hardware, software, or firmware and may be used interchangeably with terms such as, for example, logic, logic blocks, components, or circuits. A module may be an integrally constructed component or a minimum unit or part thereof that performs one or more functions. For example, the module may be configured as an application-specific integrated circuit (ASIC).

Various embodiments of the present document may be implemented by software (e.g., program 140) including instructions stored in machine-readable storage media (e.g., internal memory 136 or external memory 138). A device is a device that calls stored instructions from a storage medium and that is operable in response to the called instructions, and may include an electronic device according to the disclosed embodiments (e.g., the electronic device 101). When the instruction is executed by a processor (e.g., the processor 120), the processor may perform the function corresponding to the instruction directly or using other components under the control of the processor. The instruction may include a code generated or executed by the compiler or interpreter. A device-readable storage medium may be provided in the form of a non-transitory storage medium. Here, 'non-transitory' only means that the storage medium does not include a signal and is tangible, but does not distinguish whether data is stored semi-permanently or temporarily on the storage medium.

According to an embodiment, the method according to various embodiments disclosed herein may be included and provided in a computer program product. The computer program product can be traded between a seller and a buyer as a product. The computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may be composed of a single entity or a plurality of entities, and some of the subcomponents described above may be omitted, or other subcomponents may be further included in various embodiments. Alternatively or additionally, some components (e.g., modules or programs) may be integrated into a single entity to perform the same or similar functions performed by each respective component prior to integration. Operations performed by a module, program, or other component, in accordance with various embodiments, may be performed sequentially, in parallel, repetitively, or heuristically, or at least some operations may be performed in a different order or omitted, or other operations may be added.

In addition, the embodiments disclosed in the present document are provided for description and understanding of the disclosed technical content, and are not intended to limit the scope of the disclosure. Accordingly, the scope of the disclosure should be construed to include all changes or various other embodiments based on the technical spirit of the disclosure.

The invention claimed is:

1. An electronic device comprising:
   one or more sensors;
   an image signal processor configured to be electrically connected to at least one of the one or more sensors via a first interface and to include a first functional processing circuit and a second functional processing circuit capable of processing first output information of the first functional processing circuit;
   a vision processor configured to perform at least vision image processing;
   a main processor configured to control information processing or information transmission and reception in the one or more sensors, the image signal processor, and the vision processor;
   a third interface configured to electrically connect the first functional processing circuit and the vision processor to transfer the first output information of the first functional processing circuit to the vision processor; and
   a fourth interface configured to electrically connect the second functional processing circuit and the vision processor to transfer second output information of the vision processor to the second functional processing circuit,
   wherein the vision processor is configured to:
      receive an initial command from the main processor, the initial command being related to processing a designated function,
      perform a first processing of the designated function by using at least a portion of the first output information obtained from the first functional processing circuit based on the initial command,
      receive an interruption from the first functional processing circuit via the third interface,
      perform a second processing of the designated function based on the received interruption without receiving a further command related to the processing the designated function from the main processor, and
      generate the second output information by processing the designated function, and
      send the second output information to the second functional processing circuit.

2. The electronic device of claim 1, wherein the vision processor is configured to:
   be electrically connected to the at least one of the one or more sensors via a second interface, and process a designated function using at least a portion of information obtained through the at least one of the one or more sensors or the first output information based on an instruction.

3. The electronic device of claim 1, further comprising:
a fifth interface configured to connect the vision processor and the main processor,
wherein the vision processor is configured to:
process a designated function using at least a portion of information obtained through the at least one of the one or more sensors or the first output information, and
transmit the processed information to the main processor via the fifth interface.

4. The electronic device of claim 2,
wherein the one or more sensors comprise a first sensor and a second sensor,
wherein the first functional processing circuit is configured to process a first function using information obtained through the first sensor, and
wherein the vision processor is configured to process a second function using information obtained through the second sensor.

5. The electronic device of claim 4, wherein the second functional processing circuit is configured to process a designated function using the first output information of the first functional processing circuit and the second output information of the vision processor.

6. The electronic device of claim 1, wherein the vision processor is configured to process a second function, which is a function that can be processed through the second functional processing circuit, using first output information of the first functional processing circuit.

7. The electronic device of claim 1, further comprising:
a memory,
wherein the vision processor is configured to process a designated function using information obtained through the one or more sensors or the first output information without accessing the memory.

8. The electronic device of claim 1, wherein the vision processor is configured to receive an interruption of the image signal processor through at least one of the third interface or the fourth interface.

9. An electronic device comprising:
two or more image sensors including a first image sensor and a second image sensor;
an image signal processor configured to be electrically connected to the first image sensor set among the two or more image sensors via a first interface and including a first functional processing circuit and a second functional processing circuit capable of processing first output information of the first functional processing circuit;
a vision processor configured to perform at least vision image processing and be electrically connected to the second image sensor set among the two or more image sensors via a second interface;
a main processor configured to control information processing or information transmission and reception in the two or more sensors, the image signal processor, and the vision processor;
a third interface configured to directly connect the first functional processing circuit and the vision processor to transfer the first output information of the first functional processing circuit to the vision processor; and
a fourth interface configured to directly connect the second functional processing circuit and the vision processor to transfer second output information of the vision processor to the second functional processing circuit,
wherein the vision processor is configured to:
receive an initial command from the main processor, the initial command being related to processing a designated function,
perform a first processing of the designated function by using at least a portion of the first output information obtained from the first functional processing circuit based on the initial command,
receive an interruption from the first functional processing circuit via the third interface,
perform a second processing of the designated function based on the received interruption without receiving a further command related to the processing the designated function from the main processor,
generate the second output information by processing the designated function, and
send the second output information to the second functional processing circuit.

10. The electronic device of claim 9, wherein the vision processor is configured to process a designated function using at least a portion of information obtained through the second image sensor set among the two or more image sensors or the first output information based on an instruction.

11. The electronic device of claim 9, wherein the vision processor is configured to receive an interruption of the image signal processor through at least one of the third interface or the fourth interface.

12. The electronic device of claim 9, wherein the second image sensor set comprises an IR image sensor, and the second functional processing circuit is configured to process a designated function using the first output information of the first functional processing circuit and the second output information of the vision processor.

13. An electronic device comprising:
one or more image sensors;
a sensor hub;
an image signal processor configured to be electrically connected to at least one of the one or more image sensors via a first interface and including a first functional processing circuit and a second functional processing circuit capable of processing first output information of the first functional processing circuit;
a vision processor configured to perform at least vision image processing and be electrically connected to the at least one of the one or more image sensors and the sensor hub via a second interface;
a main processor configured to control information processing or information transmission and reception in the one or more image sensors, the image signal processor, and the vision processor;
a third interface configured to electrically connect the first functional processing circuit and the vision processor to transfer the first output information of the first functional processing circuit to the vision processor; and
a fourth interface configured to directly connect the second functional processing circuit and the vision processor to transmit second output information of the vision processor to the second functional processing circuit,
wherein the vision processor is configured to:
receive an initial command from the main processor, the initial command being related to processing a designated function, perform a first processing of the designated function by using at least a portion of the first output information obtained from the first functional processing circuit based on the initial command, receive an interruption from the first functional processing circuit via the third interface, perform a second processing of the designated function based on the received interruption without receiving a further command related to processing the designated function from the main processor, generate the second output information by processing the designated function, and send the second output information to the second functional processing circuit.

14. The electronic device of claim 13, wherein the vision processor is configured to process a designated function using at least one of information obtained through at least one of the one or more image sensors, information obtained through the sensor hub, or the first output information, based on an instruction, and wherein the second interface is configured to receive at least one interruption of the sensor hub or the image signal processor through at least one of the third interface or the fourth interface.

* * * * *